United States Patent Office 2,960,492
Patented Nov. 15, 1960

2,960,492

SULFUR-CONTAINING ORGANOSILOXANE POLYMERS, AND PROCESSES FOR MAKING THE SAME

Maurice Morton and Marvin A. Deisz, Akron, Ohio, assignors to the United States of America as represented by the Secretary of the Army No Drawing. Filed Dec. 7, 1954, Ser. No. 473,769

20 Claims. (Cl. 260—46.5)

This invention relates to sulfur-containing organosiloxane polymers, and processes for making the same, and more particularly to polymeric organosiloxane compounds having the general formula

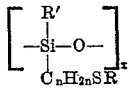

wherein $n$ is from 2 to 3, R' is a monovalent hydrocarbon radical and R is alkyl, alkylol or cyanoalkyl. These compounds are formed by a novel type reaction in which a siloxane having a radical of the vinyl series is reacted with a mercaptan, which forms an adduct therewith by combining its sulfhydril group with the unsaturated vinyl group of the siloxane.

The practice of our invention further makes it possible to obtain siloxane polymers of controlled properties, depending on the degree of polymerization of the siloxane prior to its reaction with the mercaptan.

It is also within the contemplation of our invention to react a mercaptan with a copolymer of a dialkylsiloxane and a vinyl-substituted alkylsiloxane; the type reaction between the mercaptan and the vinyl groups of the copolymer results in the formation of an adduct in a manner analogous to the adduct formation resulting from the reaction of a mercaptan and a vinyl-substituted organosiloxane homopolymer in accordance with the present invention.

The resistance of the elastomers to hydrocarbon solvents is of considerable technological importance in that it renders them useful in the making of fuel hoses, gaskets, portable gasoline tanks, and similar important military and civilian applications. The elastomers do not stiffen even at extremely low temperatures, and products made therefrom are thus useful for employment in arctic climates.

As generally pointed out above, our sulfur-containing organosiloxane polymers have the general formula

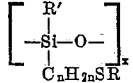

wherein $x$ is at least 3, $n$ is at least 2, R' is a monovalent hydrocarbon radical and R is a monovalent alkyl, alkylol or cyanoalkyl radical. While tetramer or pentamers of the above general formula (i.e., polymers wherein $x$ is 4 or 5) usually do not exhibit elastomeric properties, they are capable of further polymerization to yield elastomers. The non-sulfur-containing radical R' is a monovalent hydrocarbon radical, and may be aliphatic (e.g., methyl, ethyl, propyl, hexyl, tetradecyl, octadecyl, etc.), alicyclic (e.g., cyclohexyl), or aromatic (e.g., phenyl, benzyl, naphthyl, etc.). The sulfur-containing carbon chain connected to the last remaining valence of the silicon atom is characterized by a polymethylene ($C_nH_{2n}$) group of at least two carbons, wherein one carbon (ordinarily the end carbon) is connected to the sulfur atom of a mercapto group.

The type reaction which results in the formation of sulfur-containing organosiloxane polymers in accordance with the present invention may be represented by the general formula

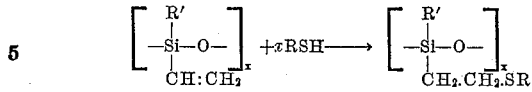

In these general formulae, R' represents a monovalent hydrocarbon radical (methyl, etc.), $x$ represents an integer of at least 3, and R represents a monovalent alkyl, alkylol or cyanoalkyl radical. Typical mercaptan reactants (RSH) are alkyl mercaptans, mercapto alkanols, and mercaptonitriles; for instance, ethyl mercaptan, n-butyl mercaptan, hexyl mercaptan, n-tetradecyl mercaptan, n-octadecyl mercaptan, mercaptoethanol, mercaptobutanol, beta-mercaptopropionitrile, beta-mercaptobutyronitrile, and their homologs. In lieu of the vinyl group of the starting siloxane, there may be substituted a homologous group of the vinyl series, such as allyl, butenyl, hexenyl, tetradecenyl, octadecenyl, etc.; thus, if the general expression R'' is used in the above type formula to designate a vinyl or allyl radical attached to the silicon atom of the starting material, the type formula will read as follows:

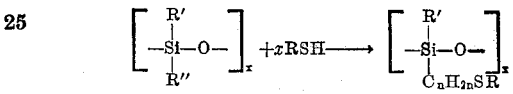

Instead of using a vinyl-substituted siloxane (i.e., an at least partly polymerized vinyl-substituted organosilicon polymer characterized by a silicon-organo-silicon linkage) as a starting material, it is also possible to react a hydrolyzable vinyl-substituted organosilicon monomer with a mercaptan to form an adduct, and to hydrolize and subsequently condense the adduct to form a sulfur-containing organosiloxane polymer of the general configuration

However, for ease of control of the reaction we presently prefer either to react the mercaptan with a tetrameric or pentameric cyclic vinyl-(or vinyl-series-) substituted siloxane, and where desired, to polymerize the adduct thus formed still further until an elastomer of the desired properties results; or to react the mercaptan with a vinyl-(or vinyl-series-) substituted siloxane polymer which already has been polymerized beyond the tetramer stage.

The following specific examples of reactions in accordance with our invention will illustrate several ways of practicing our invention, but are not intended to limit the scope of our invention to the specific reactants or conditions therein disclosed.

Example I 100 g. of vinylmethyldiethoxysilane (produced by a Grignard reaction between equimolecular proportions of $CH_3MgBr$ and vinyltriethoxysilane) were hydrolyzed by refluxing with an equal volume (116 ml.) of 5 N hydrochloric acid for 60 hours. The siloxane mixture was extracted with ether, neutralized with bicarbonate and washed with distilled water. The ether was evaporated and the mixture dried and fractionally distilled. A mixture of cyclic vinylmethylsiloxanes was obtained in about 28% yield based on the vinylmethyldiethoxysilane; the cyclic compounds correspond to the general formula

wherein $x$ is 3, 4, 5 or 6.

10.0 grams (.116 mol, on the basis of the gram-molecular weight of one repeating unit of $CH_3.SiO.CH:CH_2$; M.W. 86.1) of this cyclic siloxane mixture and 26.75 grams (.116 mol) of n-tetradecyl mercaptan (M.W. 230.1) were placed with 0.2 gram sulfur as catalyst in a round-bottom flask equipped with thermometer, stirrer and reflux condenser. The mixture was heated at 100° C. but no reaction was evident after eight hours. The temperature was raised to 150° C. Periodic amperometric titration indicated a steady disappearance of mercaptan, but after 24 hours the siloxane had condensed to a point where viscosity prevented further sampling. Approximately ⅔ of the mercaptan had disappeared. The excess mercaptan was vacuum distilled and the polymer analyzed for silicon. Silicon content was determined by fusion with $Na_2O_2$ in a Parr Bomb and subsequent colorimetric evaluation. The siloxane was found to contain 11.7% silicon. This indicates approximately 67% addition of the mercaptan; or an addition of a sulfur-containing side chain to 67 mol percent of the repeating siloxane units.

Example II

The reaction of Example I was repeated without sulfur catalyst. Equimolar amounts of cyclic siloxane and n-tetradecyl mercaptan were reacted at 130° C. Mercaptan disappearance was determined periodically in the usual manner. After 40 hours, no further disappearance was noted. At this point about 10% mercaptan remained. Subsequent silicon analysis of the siloxane confirmed that 90% addition had taken place.

Example IIIa 1 mol of cyclic vinylmethylsiloxane according to Example I (i.e., the gram molecular weight of one repeating unit of $CH_3$—$SiO$—$CH:CH_2$) was placed with 2 mols of mercaptoethanol in a round-bottom flask equipped with a stirrer. 5 ml. of pyridine was added at room temperature as a catalyst. The reaction was exothermic, the temperature rising and then dropping. The whole was stirred overnight. Amperometric titration indicated that 50% of the mercaptan had disappeared. Unreacted mercaptoethanol was removed by washing with distilled water. The siloxane was dried and analyzed for sulfur and silicon content. Sulfur was determined gravimetrically; silicon as described previously.

RESULTS

Percent silicon:
17.08 (calc. for 100% reaction)
17.01 (found)

Percent sulfur:
19.48 (calc. for 100% reaction)
19.52 (found)

Example IIIb

The reaction of Example IIIa was also carried out with a trace of benzoyl peroxide as catalyst. The solution was stirred 24 hours at 100° C. Analysis revealed 100% reaction.

The adduct, 1-(3-thio-4-hydroxy)butylmethylsiloxane,

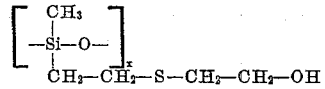

was condensed with strong acid as catalyst. The result was a hard clear resin, insoluble in the more common solvents. Apparently this compound behaves as a trifunctional monomer.

Example IV 70.41 g. of cyclic dimethylsiloxane and 4.31 g. of cyclic vinylmethylsiloxane were co-condensed to a soft, sticky gum with acid acatalyst. The gum was neutralized, dissolved in toluene and the higher molecular weight fraction precipitated with methanol.

Excess 2-mercaptoethanol, in toluene, with a trace of benzoyl peroxide, was added gradually to the copolymer on a cold mill until the gum had absorbed the liquid. The whole was heated overnight in a circulating air oven at 110° C. The gum was washed thoroughly to remove excess mercpatan and dried. Amperometric titration indicated absence of free mercaptan. The polymer was analyzed for sulfur content:

Percent sulfur—
2.04 (calc. for 100% reaction)
1.78 (found)

Approximately 87% reaction is indicated.

Example V

Cyclic vinylmethylsiloxane was condensed with acid catalyst, neutralized and washed. 4.31 g. of this polymer was blended with 70.41 g. of dimethyl silicone gum on a cold mill and mercaptoethanol addition carried out as in Exmple IV. Sulfur analysis indicated 68% addition of mercaptan

Example VI 1 mol of cyclic vinylmethylsiloxane (according to Example I) and 2 mols of beta-mercaptopropionitrile were placed in a round-bottom flask equipped with stirrer. 2 ml. pyridine was added as a catalyst and the mass stirred for 30 hours. The reaction was exothermic. Separation of product and unreacted mercaptan was accomplished by vacuum distillation. Amperometric titration indicated absence of free mercaptans. The polymer, 1-(3-thio-4-cyano-)butylmethylsiloxane, analyzed as follows:

Percent silicon—
16.19 (calc. for 100% reaction)
16.18 (found)

Percent sulfur—
18.46 (calc. for 100% reaction)
18.49 (found)

The above reaction was also carried out with equimolar proportions, and using toluene as inert solvent and benzoyl peroxide as a catalyst. Amperometric titration and analysis indicated approximately 82% addition.

Example VII

The procedure of Example V was repeated, but using beta-mercaptopropionitrile in lieu of 2-mercaptoethanol. The polymer was analyzed for sulfur content, and 1.60% sulfur found, which indicates approximately 79% reaction.

As will be seen from the foregoing detailed description, which has been given for clearness of understanding only and from which no unnecessary limitations should be inferred, it will be apparent that we have provided a new class of sulfur-containing organosiloxane polymers, together with a novel type of reaction for producing a large variety of such polymers. Accordingly, we do not desire to limit our invention to the exact details shown and described, inasmuch as those details are capable of many obvious modifications which will readily occur to those skilled in the art, but rather do we desire to claim our invention broadly as defined by the appended claims.

We claim:

1. A process of making a sulfur-containing organosiloxane polymer, comprising reacting a polymerizable organosiloxane having the formula

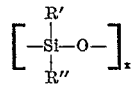

wherein R' is a monovalent hydrocarbon radical, x is at least 3, and R" is a member of the group consisting of vinyl and allyl radicals, with a mercapto alkanol, said mercapto alkanol adding across the double bond of said R" radical.

2. The process according to claim 1, wherein R' is methyl.

3. The process according to claim 1, wherein said mercapto alkanol is mercaptoethanol.

4. A process of making an elastomeric sulfur-containing organosiloxane polymer comprising polymerizing an organosiloxane having the formula

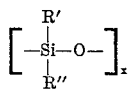

wherein R' is a monovalent hydrocarbon radical, $x$ is at least 3, and R" is a member of the group consisting of vinyl and allyl radicals, in the presence of a dialkyl silicone and a mercapto alkanol, said mercapto alkanol adding across the double bond of said R" radical.

5. A process according to claim 4, wherein said dialkyl silicone is dimethyl silicone gum.

6. A process according to claim 5, wherein said mercapto alkanol is mercaptoethanol.

7. A process of making a sulfur-containing organosiloxane polymer, comprising reacting a polymerizable organosiloxane having the formula

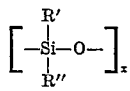

wherein R' is a monovalent hydrocarbon radical, $x$ is at least 3, and R" is a member of the group consisting of vinyl and allyl radicals, with a mercaptan, said mercaptan being a member of the group consisting of alkyl mercaptan, mercapto alkanol and mercaptonitrile, in the presence of a catalyst which is a member of the group consisting of sulfur, peroxide and pyridine, said mercaptan adding across the double bond of said R" radical.

8. A process of making a sulfur-containing organosiloxane polymer, comprising mixing a polymerizable organosiloxane having the formula

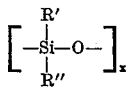

wherein R' is a monovalent hydrocarbon radical, $x$ is at least 3, and R" is a member of the group consisting of vinyl and allyl radicals, with a mercaptan, said mercaptan being a member of the group consisting of alkyl mercaptan, mercapto alkanol and mercaptonitrile, in the presence of pyridine as a catalyst, said mercaptan adding across the double bond of said R" radical.

9. An organosiloxane polymer comprising at least about 68 mol percent of repeating siloxane units having the formula

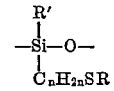

wherein $n$ is from 2 to 3, R' is a monovalent hydrocarbon radical, and R is a monovalent alkylol radical attached directly to sulfur, any remaining siloxane units being

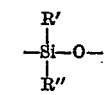

wherein R' has the same meaning as aforesaid and R" is a member of the group consisting of vinyl and allyl radicals.

10. A polymer according to claim 9, wherein R is —CH$_2$.CH$_2$OH.

11. A polymer according to claim 9, wherein R' is alkyl.

12. A polymer according to claim 9, wherein R' is methyl.

13. A polymer according to claim 12, wherein R is —CH$_2$.CH$_2$OH.

14. An elastomer comprising a mixture of a dialkyl silicone and an organosiloxane polymer comprising at least about 68 mol percent of repeating siloxane units having the formula

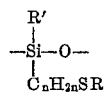

wherein $n$ is from 2 to 3, R' is a monovalent hydrocarbon radical, and R is a monovalent alkylol radical attached directly to sulfur, any remaining siloxane units being

wherein R' has the same meaning as aforesaid and R" is a member of the group consisting of vinyl and allyl radicals.

15. An elastomer according to claim 14, wherein said dialkyl silicone is dimethyl silicone.

16. A process of making a sulfur-containing organosiloxane polymer, comprising reacting a polymerizable organosiloxane having the formula

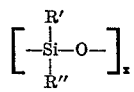

wherein R' is a monovalent hydrocarbon radical, $x$ is at least 3, and R" is a member of the group consisting of vinyl and allyl radicals, with a mercaptonitrile, said mercaptonitrile adding across the double bond of said R" radical.

17. The process according to claim 16, wherein said mercaptonitrile is mercaptopropionitrile.

18. An organosiloxane polymer comprising at least about 79 mol percent of repeating siloxane units having the formula

wherein $n$ is from 2 to 3, R' is a monovalent hydrocarbon radical, and R is a monovalent cyanoalkyl radical attached directly to sulfur, any remaining siloxane units being

wherein R' has the same meaning as aforesaid and R" is a member of the group consisting of vinyl and allyl radicals.

19. Polymer according to claim 18, wherein R' is methyl.

20. Polymer according to claim 18, containing dimethyl silicone in admixture therewith.

References Cited in the file of this patent

UNITED STATES PATENTS

| | | |
|---|---|---|
| 2,445,794 | Marsden | July 27, 1948 |
| 2,604,486 | Burkhard | July 22, 1952 |
| 2,645,628 | Hurd | July 14, 1953 |
| 2,687,424 | Sommer | Aug. 24, 1954 |
| 2,835,690 | Prober | May 20, 1958 |

FOREIGN PATENTS

| | | |
|---|---|---|
| 620,692 | Great Britain | Mar. 29, 1949 |

OTHER REFERENCES

Burkhard: J. Amer. Chem. Soc., vol. 72, March 1950, pages 1078 and 1079.